United States Patent [19]

Ratz et al.

[11] Patent Number: 5,197,668

[45] Date of Patent: Mar. 30, 1993

[54] COMMUNICATING THERMOSTAT

[75] Inventors: James W. Ratz, Bloomington; Robert J. Schnell, Plymouth; Daniel T. Uhrich, Mayer, all of Minn.

[73] Assignee: Honeywell Inc., Minneapolis, Minn.

[21] Appl. No.: 811,503

[22] Filed: Dec. 20, 1991

[51] Int. Cl.⁵ ............................................. G05D 23/00
[52] U.S. Cl. .................................... 236/51; 165/22
[58] Field of Search ................. 165/22; 236/51, 49.3, 236/78 B

[56] References Cited

U.S. PATENT DOCUMENTS

| | | | |
|---|---|---|---|
| 4,606,401 | 8/1986 | Levine et al. | 165/12 |
| 4,682,648 | 7/1987 | Fried | 236/46 R X |
| 4,819,714 | 4/1989 | Otsuka et al. | 236/46 R X |
| 4,860,950 | 8/1989 | Reiser et al. | 236/51 |
| 4,864,274 | 9/1989 | Black | 340/310 R |
| 4,916,642 | 4/1990 | Kaiser et al. | 165/22 X |
| 4,947,928 | 8/1990 | Parker et al. | 165/22 |

Primary Examiner—William E. Wayner
Attorney, Agent, or Firm—Robert B. Leonard

[57] ABSTRACT

A thermostat which includes a transceiver for receiving and sending communications externally of the thermostat. A thermostat receiving external communications from another thermostat includes an external temperature responsive portion to modify the setpoint of the receiving thermostat based on the information received by the receiving thermostat.

3 Claims, 4 Drawing Sheets

COMMUNICATING THERMOSTAT

BACKGROUND OF THE INVENTION

The present invention is directed toward the field of heating ventilating and air conditioning (HVAC) controls and more specifically to the field of thermostats.

Thermostats are well known control devices used in controlling the operation of an HVAC system. Typically, residential dwellings have had one, two or occasionally three or more thermostats for the control of one or more HVAC systems in the dwelling. Usually, there was a one to one correspondence between the number of thermostats and the number of HVAC systems being controlled.

When there was more than one HVAC system and accordingly more than one thermostat in a dwelling, the plural thermostats operated in isolation of each other. In a two HVAC system house, one HVAC system might for example control the temperature on a first level while a second HVAC system may control the temperature on a second level.

A problem existed in that two HVAC systems and thermostats operated ignorant of what the other system and thermostat were doing. While one thermostat might notice at its temperature sensor some of the effects of the other HVAC system and thermostat operation, in general, by the time the temperature sensor notice the effects of the other system, a large deviation from the temperature setpoint could result.

SUMMARY OF THE INVENTION

The present invention is a thermostat having the ability to communicate externally. This communication may occur with one or more thermostats also having the ability to communicate. The thermostat includes a temperature sensor, a data entry means, a display, a clock, a temperature responsive means and a transceiver. The temperature responsive means is comprised of a memory for storing one or more setpoint temperatures and a comparator for comparing the setpoint temperature to the temperature sensed by the temperature sensor. A further enhancement to the temperature responsive means may be the inclusion of an external temperature responsive means which adjusts the operation of the temperature responsive means according to data received from external sensors, including thermostats, through the transceiver.

DETAILED DESCRIPTION OF THE PREFERRED EMBODIMENT

Figure 1:
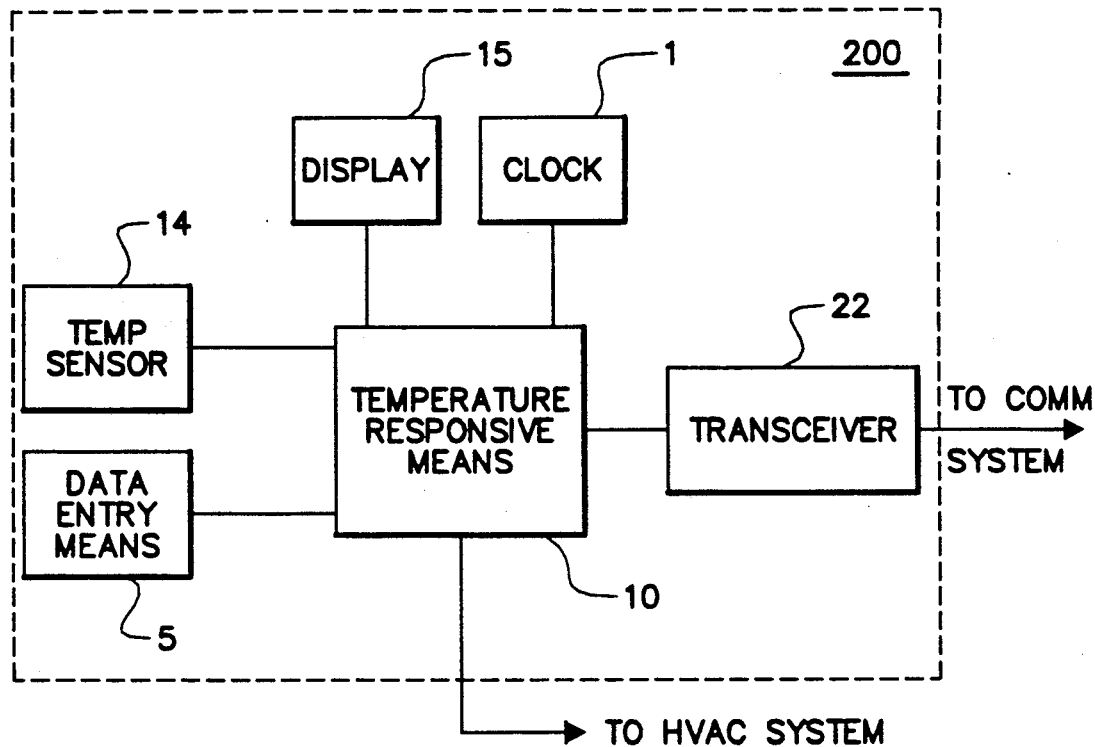
FIG. 1 is a block diagram of the presently inventive thermostat.

FIG. 1 shows a block diagram of the presently inventive thermostat 200. The thermostat includes data entry means 5, temperature responsive means 10, clock 11, temperature sensor 14, display 15 and transceiver 22.

The temperature responsive means 10 is the heart of the thermostat. It receives a temperature signal from temperature sensor 14 and compares the temperature signal to a prestored temperature setpoint. If the temperature signal deviates from the temperature setpoint by a preselected amount, temperature responsive means activates an appropriate portion of the HVAC system to cause the sense temperature to move towards the temperature setpoint. The temperature responsive means may be a microprocessor having internal memory.

The temperature setpoint can be entered into the temperature responsive means through the data entry means 5. The data entry means may be a keyboard.

While not absolutely necessary to the present invention, display 15 is useful in entering a temperature setpoint into the thermostat and for display of information related to the HVAC system. The display may display the current room temperature, the current setpoint, the current time as indicated by clock 11, and the current status of the HVAC system.

Transceiver 22 is responsible for both transmitting and receiving information relates to the operation of the HVAC system. In the transmit mode, transceiver 22 may transmit through the external communication system, the current temperature setpoint, the current temperature signal and/or current status of the HVAC system. In the receive mode, the transceiver may receive instructions to modify the current temperature setpoint, a future temperature setpoint, or information on the operation of another HVAC system. This information is then passed on to the temperature responsive means for appropriate action. The external temperature responsive means may use the information as described below with reference to FIG. 3.

Figure 1A:
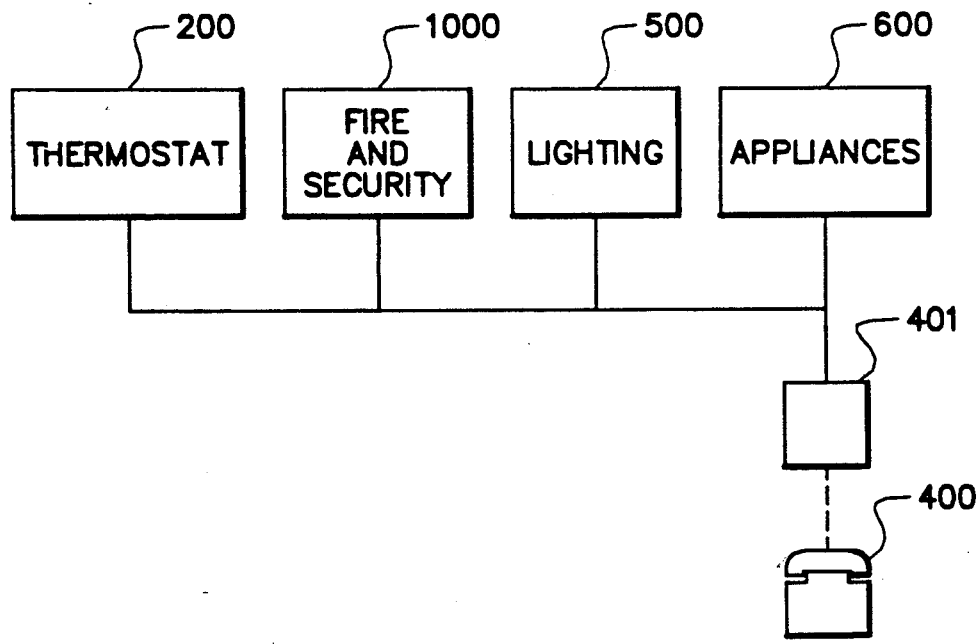
FIG. 1A is a block diagram showing the thermostat system with other residential control systems.

Referring now to FIG. 1A, thereshown is an exemplary home automation system including at least one thermostat 200.

Fire and security alarm 1000, and lighting control system 500, an appliance control 600, and a telephone connection 401 for use with telephone 400 are included. The fire and security alarm system 1000 includes fire and security sensors distributed throughout the dwelling. Lighting control system 500 includes a central controller which is capable of control of all lighting throughout a building based on control factors such as time and occupancy.

Appliance control system 600 allows for the central control of multiple appliances such as a coffee maker, a curling iron, washer and dryer, microwave oven, dishwasher and the like.

Telephone interface 401 allows the user to modify any of the foregoing systems remotely through use of a touch tone telephone.

One of the above listed subsystems, such as the security system, may have a master control panel which is capable of controlling all of the subsystems connected to the home automation system.

Figure 2:
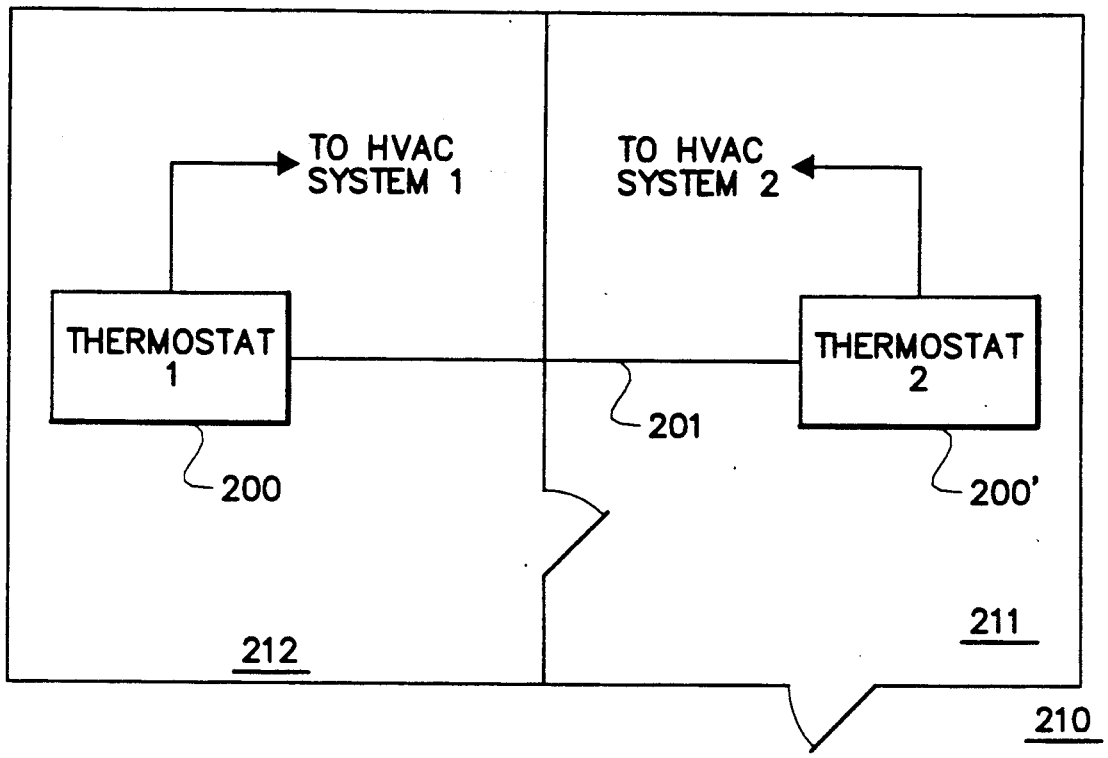
FIG. 2 is a combination block and plan view diagram showing the location of two thermostats within a building.

Referring now to FIG. 2, there shown is a combination plan view and block diagram of two thermostats controlling two HVAC systems in a single building.

Building 210 is subdivided into rooms 211 and 212. Room 211 contains thermostat 200' while room 212 contains thermostat 200. Thermostat 200 is connected to HVAC system 1 while thermostat 200' is connected to HVAC system 2. Thermostats 200 and 200' are connected by communication line 201. Communications between thermostat 200 and thermostat 200' may occur using a protocol such as the one disclosed in U.S. patent application Ser. No. 07/811,772 entitled A DC BALANCED 4B/8B BINARY BLOCK CODE FOR DIGITAL DATA COMMUNICATIONS by Meyer which is commonly assigned with the present application. As was noted earlier, the thermostats may share current setpoint, future setpoint, current temperature signal and current HVAC system operation information across communication line 201.

As was noted earlier, operation of HVAC system 2 may affect the temperature in space 212. Accordingly, information from thermostat 200' may be passed to thermostat 200 so that thermostat 200 can adapt its setpoint to account for the operation of HVAC system 2. This is done in external temperature responsive means 10C.

Figure 3:
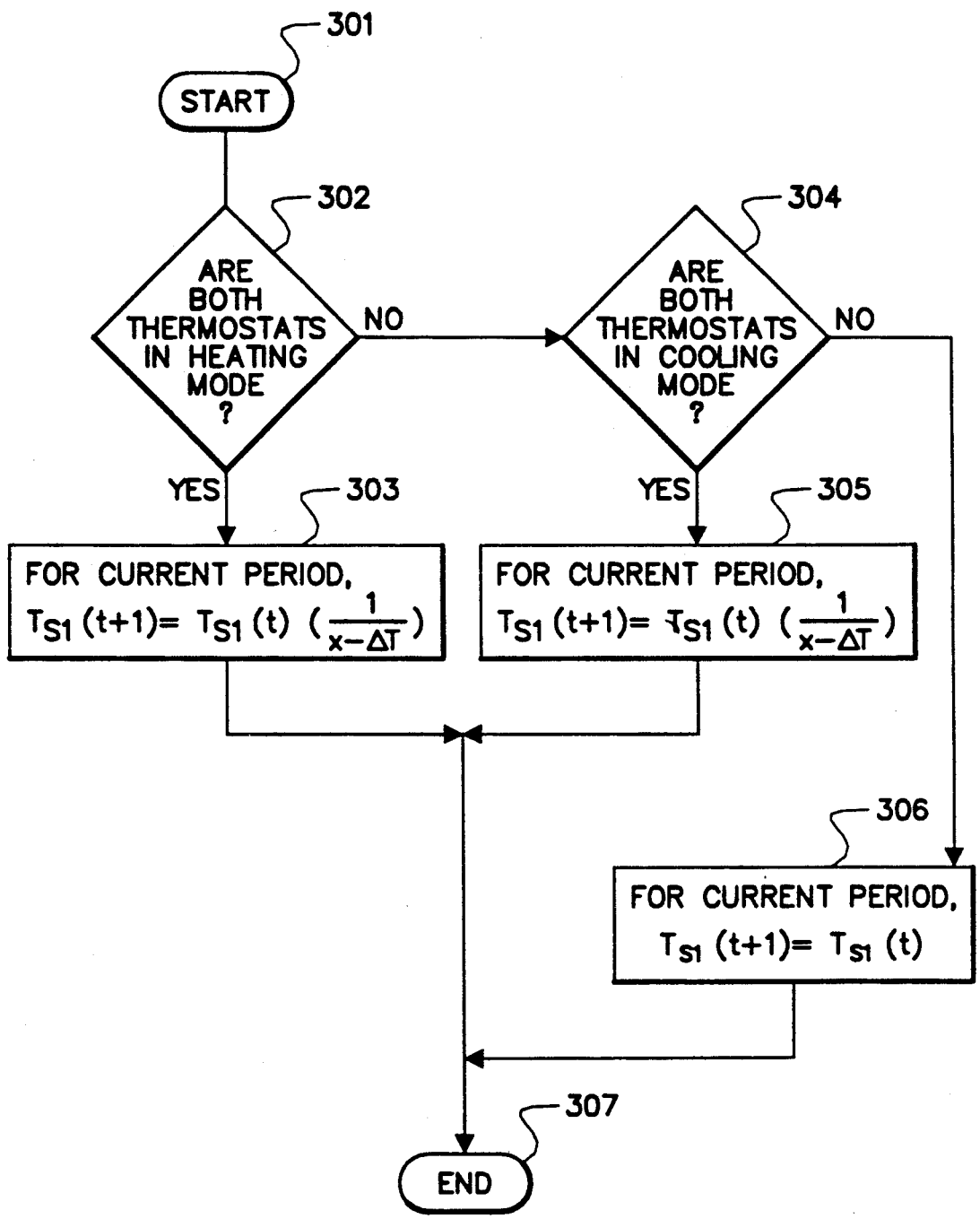
FIG. 3 is a flow chart of the operation of the external temperature responsive means.
Figure 3A:
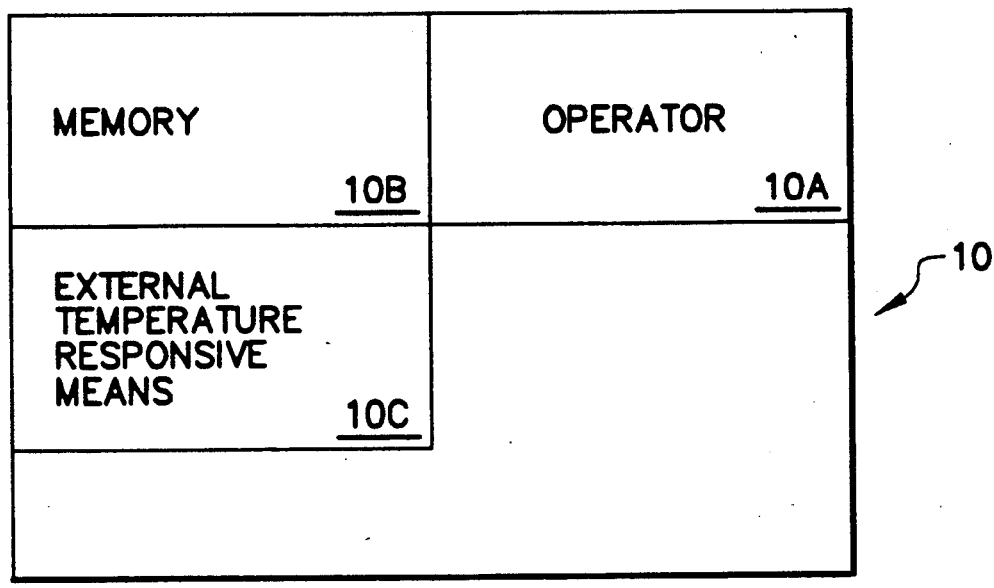
FIG. 3A is a block diagram of an exemplary temperature responsive means.

A sample process for modifying the setpoint of one thermostat based on the setpoint of another thermostat is shown in FIG. 3. Note that in this exemplary process one thermostat setpoint is modified while the other remains unaffected. After starting at block 301, the process comes to decision block 302 where the thermostat determines whether both thermostats are in a heating mode. If the answer is yes, the process moves to block 303 where the setpoint of the first thermostat at the next time $T_{s1}(t+1)$ is set equal for the current period to the present setpoint of the first thermostat $T_{s1}(t)$ times the reciprocal of X-DELTA T, where DELTA T is equal to the difference between $T_{s1}$ and the current setpoint temperature of the second thermostat $T_{s2}$, and X is a user defined coefficient which is based upon the heat transfer between the controlled spaces. X should be determined experimentally for each particular situation over time as buildings can vary widely. X could be equal to 1 to start the experimentation process. After modifying the setpoint at block 303, the external temperature responsive means ends its operation at block 307.

If the answer to block 302 is no, the process moves to block 304 where the process determines whether both thermostats are in a cooling mode. If the answer is yes, $T_{s1}(t+1)$ is set equal for the current period to $T_{s1}(t)$ times the reciprocal of the quantity X plus DELTA T. The process then is finished at block 307.

If the answer to block 304 is no, $T_{s1}(t+1)=T_{s1}(t)$ for the current period.

If the thermostat has time and temperature-periods, such as the thermostat disclosed in U.S. Pat. No. 4,606,401, (Levine et al.) which is incorporated herein by reference, then the process at blocks 303, 305 and 306 only affects the setpoint temperature for the current time-temperature period.

The foregoing has been a description of a novel and non-obvious thermostat. The applicants do not intend that the foregoing description limit their invention, but instead define the limits of their invention in the claims appended hereto.

We claim:

1. A thermostatic control system for controlling the temperature in first and second spaces in a building, each space having its own means for conditioning the temperature of the space, comprising:

a first thermostat located in the first space, said first thermostat having a setpoint and a transceiver for transmitting said setpoint; and a second thermostat located in the second space and connected to said first thermostat, said second thermostat having a setpoint, a transceiver and an external temperature responsive means, said setpoint of said second thermostat being modified by said external temperature responsive means as a function of a difference in setpoints between said first and second thermostats.

2. The thermostatic control system of claim 1, wherein:

said first and second thermostats are both operating in a heating mode; and said external temperature responsive means reduces said setpoint of said second thermostat when said difference is greater than zero.

3. The thermostatic control system of claim 1, wherein:

said first and second thermostats are both operating in a cooling mode; and said external temperature responsive means increases said setpoint of said second thermostat when said difference is greater than zero.

* * * * *